Dec. 31, 1935.  G. BROULHIET  2,025,720
INDEPENDENT WHEEL SUSPENSION
Filed Aug. 15, 1932  4 Sheets-Sheet 1

Dec. 31, 1935. G. BROULHIET 2,025,720
INDEPENDENT WHEEL SUSPENSION
Filed Aug. 15, 1932 4 Sheets-Sheet 4

Inventor
Georges Broulhiet
By Sommers & Young
Attys.

Patented Dec. 31, 1935

2,025,720

UNITED STATES PATENT OFFICE 2,025,720

INDEPENDENT WHEEL SUSPENSION

Georges Broulhiet, Paris, France

Application August 15, 1932, Serial No. 628,916
In France August 28, 1931

6 Claims. (Cl. 280—96.2)

This invention relates to a front axle which may be applied to motor vehicles of all kinds and more particularly to those in which the carriage frame offers great torsional strength.

The axle according to the present invention which constitutes the frame front cross girder, is particularly characterized in that it is provided at both ends with upward directed extensions upon which a system comprising a sleeve, the wheel steering swivel and its corresponding wheel, slides and is pivoted.

The chief characteristic of this invention consists in that a double oil shock absorber is placed inside both upward extensions in order to damp the movements of the movable system, the piston of said shock absorber being connected to the sliding sleeve.

A device capable of insuring a damping effect proportionate to the rate of the movement of the piston may be added to the above system.

Another feature of this invention consists in that the axle is bent at both ends in a horizontal plane, so as to allow of mounting the suspension spring in the vertical plane of the axis of the extension which is thus displaced relatively to the middle of the axle.

Another feature consists in that the sliding sleeve is provided at its upper part with a ball abutment collar connected with the suspension spring by means of long slanting shackles suitably shaped to allow the passage of the steering device.

Another object of my invention relates to a particular mode of construction of the device designed to annihilate the phenomena of cavitation which would tend to take place through the shocks acting upon the shock absorber.

To this end one of the ends of the cylindrical shock absorber is movable the change of volume resulting from the movements of the plunger rod being compensated by the displacement of said movable end. The latter is also acted upon by a strong spring thus creating in the liquid an inner pressure which is higher than the highest working pressure. This spring is automatically armed by the abutment of the movable end at the end of the stroke every time that the quantity of liquid contained in the cylinder becomes insufficient.

Lastly means are provided to insure the filling of the cylinder with liquid so that the apparatus works surely and regularly.

The appended drawings show by way of examples, two forms of execution of this invention in the case of its application to the front axle of a motor vehicle.

In these drawings:

Figs. 1 and 2 are respectively a plan view and a diagrammatical elevation of my improved axle device.

Fig. 3 is a vertical sectional view showing the wheel system swinging and sliding upon the upward extension of the axle at the end of the downward stroke.

Fig. 4 is a vertical sectional view, drawn on a larger scale in a plane passing through the pivotal axis of one of the steering wheels, showing the arrangement of a modification of the shock absorber in its middle position.

Figure 1:
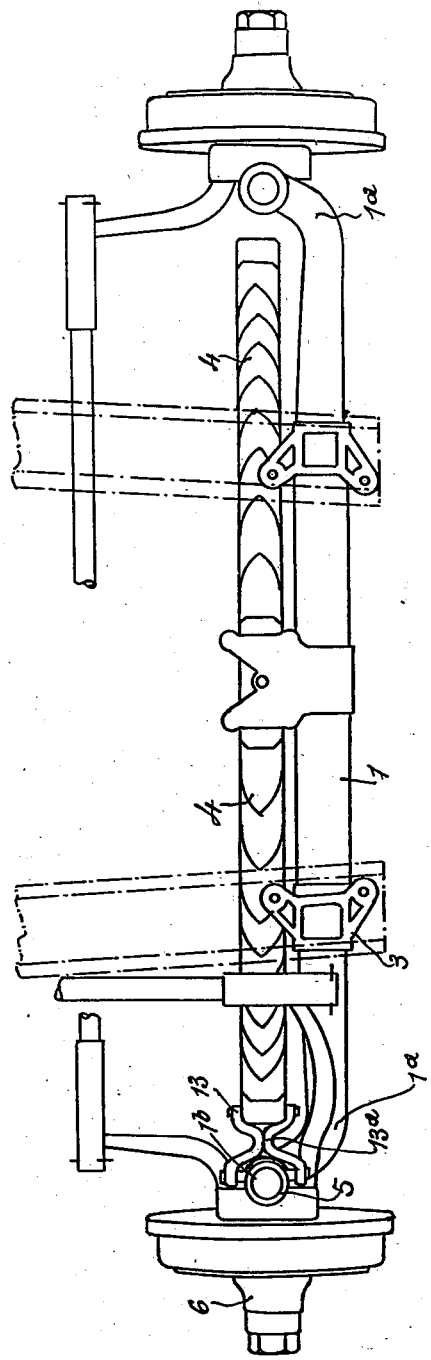
Figs. 1 to 3 show a first form of construction and Fig. 4 shows the second form of execution.
Figure 2:
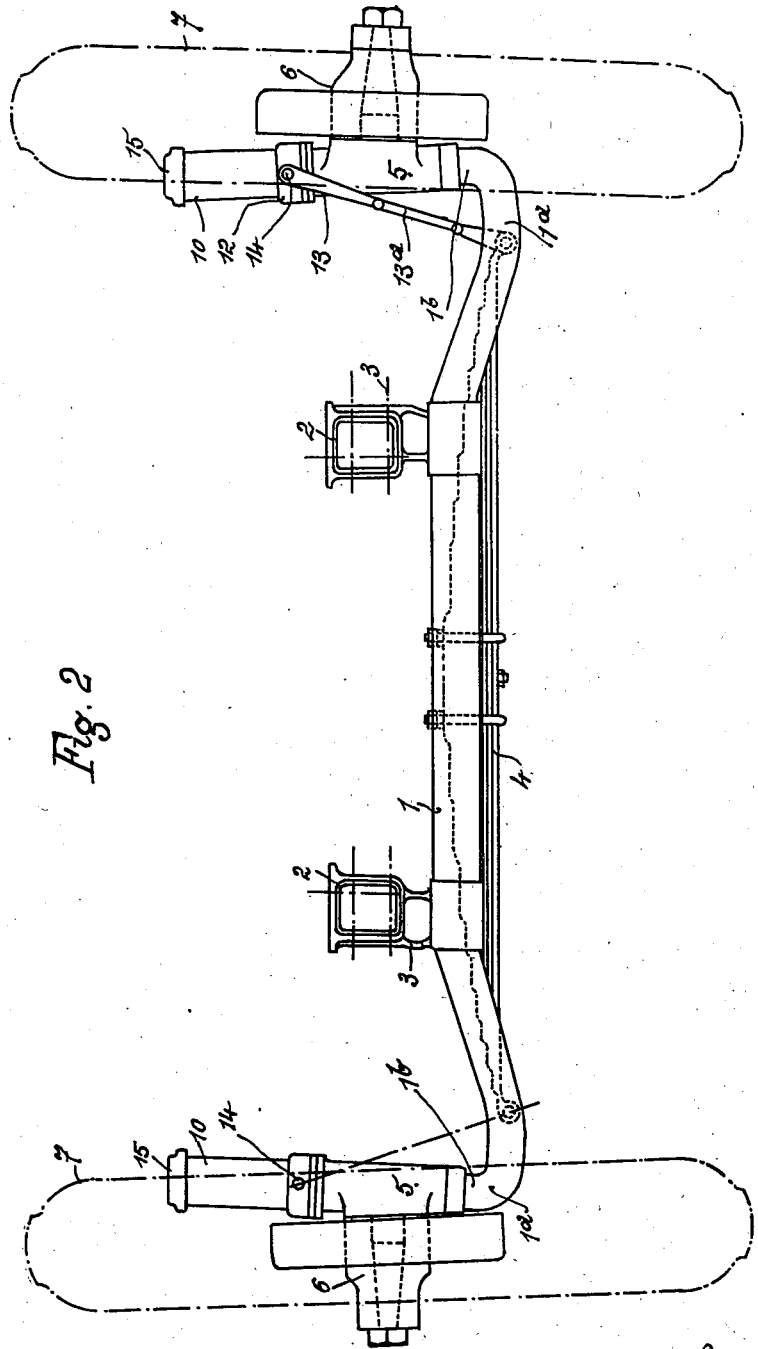
Figure 3:
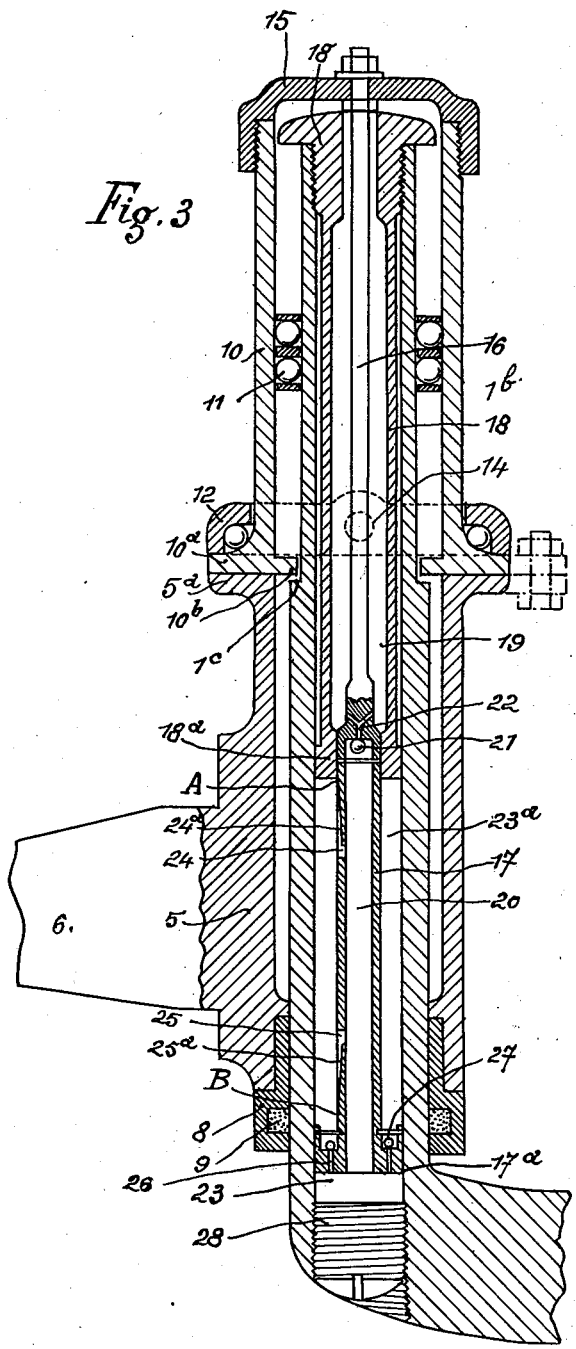

In the form of construction shown in Figs. 1 to 3, the axle 1 which is strongly secured to the carriage frame 2 by means of metal fittings 3 is provided near its ends with symmetrical bent portions 1$^a$ having upward extensions 1$^b$ displaced to the back of the middle plane of the axle, in such a manner as to allow of placing the suspension spring 4 in the plane passing through said extensions.

A sleeve 5 integral with the steering swivel 6 of wheel 7 is engaged upon each extension 1$^b$. This sleeve is capable of rotating and sliding upon the lower part of the extension by means of a ring shaped bearing 8, provided with a circular recess to receive a grease proof India rubber ring designed to insure the water tightness of the pivotal connection. The sleeve 5 carries also a sleeve 10, which may swing and slide upon the upper part of the upward extension more exactly upon several rows of balls 11 the cage of which is drawn by the rolling of the balls upon said extension at a speed which is half that of the sliding movement.

The sleeves 5, 10 are both provided with shoulders 5$^a$, 10$^a$ respectively and they are assembled by means of bolts. The upper sleeve 10 is surrounded by a ball collar 12 connected with the suspension spring 4 by means of long shackles 13 pivoted around an axis 14 carried upon said collar. The spring 4, the shackles 13, the upward extensions 1$^b$ and the collars 12 are located in the same plane transversely to the axis of the carriage frame behind the middle plane of the axle. The shackles 13 are made narrower in the middle at 13$^a$, that is to say that at that point their cheeks are tightly put in juxtaposition in the manner shown in Fig. 1 or else constitute a single part in order to allow the free passage of the steering lever.

It will be noted that owing to the obliquity of the shackles relatively to the upward extensions, the lateral component of the re-actions acting upon the lower sleeve 8 is considerably reduced this giving great importance to this slanting arrangement of the shackles.

The upper sleeve 10 is closed by means of a cap 15 upon which the rod 16 of an oil shock absorber piston 17 is secured. A tubular part 18 screwed upon the top of the upward extension 1b constitutes a cylinder 19 having a larger section than that of piston 17. The latter comprises an inner chamber 20 which may communicate with the cylinder 19 by means of a free ball valve 21 and of passages 22. The chamber 20 is put in communication on the other part with the inner cylindrical bore 23 in the upward extension which forms an annular space 23a surrounding the piston, by means of two orifices 24, 25 into each of which opens an inclined groove 24a, 25a formed upon the outer surface of the piston. A smooth portion which engages in an airtight manner a guiding shoulder 18a of part 18 when the piston is at the end of its downward stroke, is formed above the groove 24a. The piston is provided under the groove 25a with another smooth portion followed by a shoulder 17a. Channels 26 which may put in communication the annular chamber 23a with the lower part of the oil cylinder 23 by means of a free ball valve 27 are provided in the shoulder 17a. The oil cylinder is hermetically closed at the bottom by means of a screw plug 28.

The parts being in the position shown in Fig. 3, it will easily be seen that on the piston actuated by the corresponding wheel starting again its upward stroke the valves 27 will close, the oil contained in the space 23a will flow on the one part through the orifices 24, 25 in the room 20 and, on the other part through the groove 24a in the cylinder 19, then through orifice 25 and valve 21 in room 20 only; the oil will then flow from the space 23 through groove 25a in the cylinder 19 and the braking of the movement will increase as the groove gets narrower. Finally when the end point B of groove 25a will have reached the shoulder 18a (that is occupies the place of point A in Fig. 3) the stroke will be stopped. During the complete stroke the valve 21 on its part will have allowed the communication to be made between 19 and 20.

Point B having thus reached the point A, when the movable system moves downwards, the valve 21 will close, the valves 27 open and the annular space 23a the volume of which gradually increases will fill with oil, oil being also driven in cylinder 19 through orifice 24. When the latter has come opposite the shoulder 18a the braking effect begins and the stroke is stopped when the point A of the piston is in the position shown in Fig. 3 as the exhaust in the direction of cylinder 19 will no longer take place.

It will be seen that the above device produces the damping at both ends of the stroke. When running the shoulder 10b never engages the shoulder 1c (Fig. 3) neither does the shoulder 10b engage the ball abutment 11.

Figure 4:
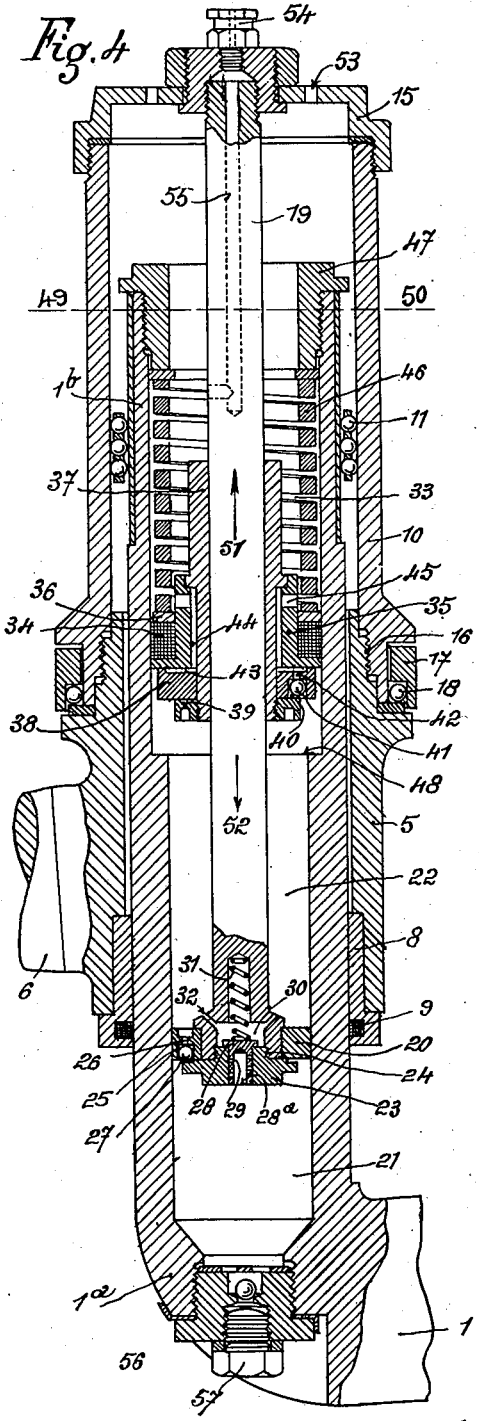

In the modification shown in Fig. 4, the general arrangement is the same except that in this case the sleeve 10 which lies in the same axis as sleeve 5 is shown as being secured upon it by means of a screwed portion 16. A concentric ring 17 connected with the suspension spring 4 by means of long shackles 13 pivoted upon pins 14 formed in one with said ring 17, is inserted between the sleeves 5 and 10. This ring 17 is centered upon the sleeve 10 by means of balls 18 through which it transmits part of the vehicle weight to sleeve 5, steering swivel 6 and wheel 7.

It will be noted that owing to the slanting position of the shackle 13 relatively to the upward extension 1b, the side component of the reactions acting upon the sleeves 5 and 10 is mostly transferred upon the balls 11; the stress is thus almost completely removed from the ring bearing 8. It will be evident that the ball cage 11 could be replaced by a smooth bearing fixed at the top of the upright extension 1b.

The upper sleeve 10 is closed by means of a cap 15 screwed upon it and is integral with a rod 19 carrying the ring 20 which forms the damping piston. This ring 20 moves in a cylindrical part 21—22 bored in the extension 1b, it is secured upon the rod 19 by means of a part 23 provided with a screw threaded portion 24.

The ring 20 is provided with one or more cylindrical recesses 25 which allow the communication between both sides of the piston through a calibrated hole 26, which may be closed by a ball 27. The balls 27 are retained in the recesses 25 by means of a flange provided in part 23. When the ball 27 uncovers the hole 26, both sides of the piston 20 communicate together through this calibrated hole 26.

A piston valve 28 provided with calibrated holes 29 is carried upon the part 23 and moves in a recess 30 in rod 19, it is seated in the part 23 by means of a spring 31 placed in rod 19. Both sides of the piston 20 communicate through holes 32 having a large diameter when the piston-valve 28 is raised from its seat.

The calibrated holes 29 in the piston valve 28 have the same diameter but the space between them increases as they near the open end 28a of said piston valve, the rule applied to the spacing of the holes is preferably a parabolic rule. Consequently the total passage section provided at all times by the piston valve holes 29 is proportionate to the square root of the liquid pressure, so that finally the braking effect upon the liquid passing through the holes 29 is proportionate to the speed of piston 20, this being the theoretical condition of the critical damping of the piston periodical movement.

A cylindrical portion 33 concentric to the cylindrical portion 21—22 is bored in the upper part of the upward extension 1b.

The cylinder movable end is constituted by a plastic ring 34 clamped around a sleeve 35 by means of a washer 36, said sleeve 35 being centered upon a socket 37 carrying a ring 38 which is maintained in position against the sleeve 35 by means of a nut 39.

The plunger rod 19 has a slightly frictional sliding movement in the socket 37.

The ring 38 is provided with one or several recesses 40 which contain a ball 41 designed to close an orifice 42. The ball or balls 41 are retained in the recess or recesses 40 by the upper surface of nut 39.

Both surfaces of the movable cylinder end 34 may be put in communication through the recesses 40, the orifice 42, the annular space 43 in ring 38, the cylindrical space 44 between socket 37 and sleeve 35 and the large diameter openings 45 in sleeve 35.

A spiral spring 46, concentric to the rod 19 presses strongly upon the washer 36, taking its bearing point upon a cap 47 screwed in the upper part of the extension 1b.

When in an inoperative position, under the action of spring 46, the ring 38 engages the shoulder 48 at the intersection of the cylindrical portions 22, 23 bored in the extension 1b (position not represented).

The parts being in the position shown in Fig. 4 and the cylindrical portions 21, 22, 33 filled with liquid, oil for example, up to the level 49-50, the mode of operation is as follows:

When the carriage wheel 7 meets an obstruction and receives a shock, the suspension spring 4 bends and the sleeve 10 slides upwards upon the upward extension 1b.

The rod 19 is drawn in the way shown by the arrow 51, the liquid pressure in part 22 of the cylinder rises above that in part 21. The ball 27 uncovers the calibrated hole 26 and the liquid flows from 22 to 21 thus braking the movement of piston 20 and consequently damping the shock upon the wheel 7.

The orifice section remaining constant the delaying stress which acts upon the piston 20 is proportionate to the square of the moving speed in the direction of arrow 51 thus producing a quick and efficient damping.

The action of spring 46 upon the movable cylinder cover 34 produces an inner pressure, it being devised in such a manner that this inner pressure is stronger than the strongest working pressure.

Consequently the cylinder part 21 will always be kept filled owing to the charge bearing upon the liquid in part 22.

The movement of rod 19 in the direction shown by the arrow 51 is interrupted by the reaction of the suspension spring 4 and by the damping effect as above described.

The obstruction that produced the movement having been removed the spring 4 will tend to return the wheel 7 in its first position and the rod 19 will then move in the direction shown by the arrow 52. The liquid pressure in part 21 will then become higher than that in part 22 and the balls 27 will close the orifices 26.

Under the action of the varying pressure the piston valve 28 presses upon the spring 31 and uncovers one or more calibrated holes 29; the liquid then flows in the cylinder from part 21 to part 22 thus producing a braking of the movement of piston 20 and consequently a damping of the return movement of wheel 7.

Through its compression the spring 31 measures the pressure difference between the cylinder parts 21, 22 and as above explained, the delaying effect upon the piston 20 is proportionate to the moving speed in the direction of the arrow 52 thus producing a critical damping which changes the periodical movement due to the elasticity of the suspension springs 4 into an aperiodic movement, the movement will thus be caused to stop in the first quarter of the oscillating stroke whatever the amplitude of the displacement may be relatively to the position of equilibrium.

It must be noted that when the rod 19 moves in the direction shown by the arrow 51, the movable cylinder end 34 moves in the opposite direction in order to compensate for the volume created by the rod 19, both movements being in inverted ratio to the sections. The same thing happens when the rod 19 moves in the direction shown by the arrow 52. During these movements the socket 37 slides upon the rod 19 and the level of the liquid falls or rises in the cap 47.

In the above description of the mode of working it has been supposed that the spring 46 was compressed and that the ring 38 was at a sufficient distance from the flange 48. Supposing now that the ring 38 is resting upon the shoulder 48 either at the time of the first assembling or after a long period of rest.

On the first shock received by the carriage wheel 7, the rod 19 moves in the direction of the arrow 51; the inner volume of the cylinder 10 decreases owing to the return of the rod 19 and consequently the pressure in the cylinder part 22 falls under atmospheric pressure acting through the orifices 53. The ring 38 abutting against the shoulder 48, the movable cover cannot compensate for this change of pressure by its displacement as in the case of normal working. The balls 41 then uncover the orifices 42 and the liquid flows from the cylindrical part 33 to the cylinder parts 22, 21.

Upon the consecutive displacement of the rod 19 in the direction of the arrow 52, the pressure increases in the cylinder part 22 and rises above atmospheric pressure. The ball 41 closes the opening 42 and the movable cylinder end 34 rises compressing the spring 46 which is thus armed.

This automatic arming of the spring due to the abutting of the movable cylinder end at the end of its stroke takes place every time that the quantity of liquid in the cylinder parts 21, 22 becomes insufficient.

The accidental liquid losses are periodically compensated by injecting liquid for example through the plug 54 and the bore 55 in rod 19.

A lower ball valve 56 normally closed by a screw plug 57 serves for the first filling of the apparatus.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

What I claim and desire to secure by Letters Patent of the United States is:

1. A front axle assembly for vehicles having steering wheels with independent relative movements, said axle forming the front cross-beam of the chassis, an upward extension on both ends of said axle, an arrangement comprising a sleeve, wheel and wheel steering swivel, which slides and turns upon said upward extension, a cage with floating balls provided between said upward extensions and sleeves, the balls projecting from each side of the cage wall and in contact on one side with said sleeve and on the other side with said upward extension, so that the cage moves at half-speed of the relative movements of the sleeve and the upward extension, a rotatable collar mounted upon said sleeve, a transverse spring affixed at the center of said front cross-beam, long oblique side members connecting each end of said transverse spring to the said rotatable collar, the front axle being bent in a horizontal plane at each of its ends so that the side members and the transverse spring are in the vertical plane passing through said upward extensions.

2. A telescopic suspension for the front wheels of motor vehicles, comprising a frame having an axle, the end portion of said axle being bent rearwardly of its body portion, and forming a substantially vertical guiding support, a wheel carrying member including an upwardly directed steering pivotal member mounted in telescopic relation to said support, and a wheel spindle outwardly extending from the lower portion thereof, a transversely directed leaf spring secured to the central portion of said frame behind the body portion of said axle, and means connecting the free end of said spring to the adjoining wheel carrying member, allowing angular movements of said wheel carrying member about the axis of its pivotal support, with respect to said spring.

3. A telescopic suspension for the front wheels of motor vehicles, comprising a frame having an axle, the end portion of said axle being bent rearwardly of its body portion, and forming a substantially vertical guiding support, a wheel carrying member including an upwardly directed steering pivotal member mounted in telescopic relation to said support, and a wheel spindle outwardly extending from the lower portion thereof, a transversely directed leaf spring secured to the central portion of said frame behind the body portion of said axle, and means connecting the free end of said spring to the adjoining wheel carrying member, allowing angular movements of said wheel carrying member about the axis of its pivotal support, with respect to said spring, and also allowing relative vertical displacements of one of said elements with respect to the other.

4. A telescopic suspension for the front wheels of motor vehicles, comprising a frame having an axle, the end portion of said axle being bent rearwardly of its body portion, and forming a substantially vertical guiding support, a wheel carrying member including an upwardly directed steering pivotal member mounted in telescopic relation to said support, and a wheel spindle outwardly extending from the lower portion thereof, a transversely directed leaf spring secured to the central portion of said frame behind the body portion of said axle, and means connecting the free end of said spring to the adjoining wheel carrying member, allowing angular movements of said wheel carrying member about the axis of its pivotal support, with respect to said spring, and also allowing relative vertical displacements of said guiding support and wheel carrying member with respect to one another.

5. A telescopic suspension for the front wheels of motor vehicles, comprising a frame having an axle, the end portion of said axle being bent rearwardly of its body portion, and forming a substantially vertical guiding support, a wheel carrying member including an upwardly directed steering pivotal member mounted in telescopic relation to said support, and a wheel spindle outwardly extending from the lower portion thereof, a transversely directed leaf spring secured to the central portion of said frame behind the body portion of said axle, a member mounted for vertical movement with said steering pivotal member and capable of turning movement with respect thereto, and an inwardly directed link member connecting said last member to the adjoining free end of said spring.

6. A telescopic suspension for the front wheels of motor vehicles, comprising a frame having an axle, the end portion of said axle being bent rearwardly of its body portion, and forming a substantially vertical guiding support, a wheel carrying member including an upwardly directed steering pivotal member mounted in telescopic relation to said support, and a wheel spindle outwardly extending from the lower portion thereof, a transversely directed leaf spring secured to the central portion of said frame behind the body portion of said axle, a member mounted for vertical movement with said steering pivotal member and capable of turning movement with respect thereto, and an inwardly directed link member connecting said last member to the adjoining free end of said spring, said link member being articulatedly connected to said pivotal connecting member and said spring, so as to allow relative vertical displacements of said guiding support and wheel carrying member with respect to one another.

GEORGES BROULHIET.